United States Patent
Schneider

(10) Patent No.: US 10,336,278 B2
(45) Date of Patent: Jul. 2, 2019

(54) INFLATABLE AIRBAG HARNESS ASSEMBLIES

(71) Applicant: Autoliv ASP, Inc., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 55 days.

(21) Appl. No.: 15/650,678

(22) Filed: Jul. 14, 2017

(65) Prior Publication Data

US 2019/0016288 A1    Jan. 17, 2019

(51) Int. Cl.
| | |
|---|---|
| *B60R 21/00* | (2006.01) |
| *B60R 21/18* | (2006.01) |
| *B60R 21/207* | (2006.01) |
| *B60R 21/231* | (2011.01) |
| *B60R 21/2338* | (2011.01) |

(52) U.S. Cl.
CPC ............ *B60R 21/18* (2013.01); *B60R 21/207* (2013.01); *B60R 21/2338* (2013.01); *B60R 21/23138* (2013.01); *B60R 2021/0004* (2013.01); *B60R 2021/0006* (2013.01); *B60R 2021/0009* (2013.01); *B60R 2021/0044* (2013.01); *B60R 2021/0048* (2013.01); *B60R 2021/23146* (2013.01); *B60R 2021/23386* (2013.01)

(58) Field of Classification Search
CPC ................ B60R 21/18; B60R 21/2338; B60R 21/23138; B60R 21/207; B60R 2021/23386; B60R 2021/23146; B60R 2021/0044; B60R 2021/0048; B60R 2021/0004; B60R 2021/0006
See application file for complete search history.

(56) References Cited

U.S. PATENT DOCUMENTS

| | | | |
|---|---|---|---|
| 5,496,061 A | 3/1996 | Brown | |
| 5,556,129 A * | 9/1996 | Coman | B60R 21/207 280/730.2 |
| 6,382,666 B1 * | 5/2002 | Devonport | B60R 21/18 280/730.1 |
| 6,499,763 B1 * | 12/2002 | Mishima | B60R 21/18 280/733 |
| 7,584,990 B2 | 9/2009 | Suyama et al. | |
| 8,091,920 B2 | 1/2012 | Loibl et al. | |
| 8,448,981 B2 * | 5/2013 | Fukawatase | B60R 21/207 280/730.2 |
| 8,661,625 B2 | 3/2014 | Carene et al. | |

(Continued)

FOREIGN PATENT DOCUMENTS

| | | |
|---|---|---|
| DE | 4305291 A1 | 9/1993 |
| DE | 102006050868 A1 | 4/2008 |

(Continued)

*Primary Examiner* — Drew J Brown
(74) *Attorney, Agent, or Firm* — Stoel Rives LLP

(57) ABSTRACT

Inflatable harness airbag assemblies are disclosed. The airbag assemblies can include a housing, an inflator assembly, and an inflatable cushion. The inflatable cushion can include a first lateral chamber that is configured to deploy at a first lateral side of a vehicle occupant, and a second lateral chamber that is configured to deploy at a second lateral side of the vehicle occupant. The first and second lateral chambers can be configured to receive at least a portion of a head and a torso of the vehicle occupant during a vehicle impact event.

24 Claims, 11 Drawing Sheets

(56) References Cited

U.S. PATENT DOCUMENTS

| | | |
|---|---|---|
| 8,714,589 B2 | 5/2014 | Santana-Gallego et al. |
| 9,738,252 B1 * | 8/2017 | Shoda ................... B60R 22/48 |
| 2009/0179406 A1 * | 7/2009 | Haraoka ................. B60R 21/18 |
| | | 280/733 |
| 2010/0025972 A1 * | 2/2010 | Nezaki ................... B60R 21/18 |
| | | 280/730.1 |
| 2011/0006508 A1 * | 1/2011 | Nezaki .................. B60N 2/688 |
| | | 280/733 |
| 2014/0300088 A1 * | 10/2014 | Fukawatase ............ B60R 21/13 |
| | | 280/729 |
| 2014/0327234 A1 | 11/2014 | Heurlin et al. |
| 2015/0091278 A1 * | 4/2015 | Yasuoka ............. B60R 21/2334 |
| | | 280/729 |
| 2017/0043741 A1 * | 2/2017 | Kobayashi ............... B60N 2/42 |
| 2017/0136977 A1 * | 5/2017 | Ohno .................... B60R 21/013 |
| 2017/0203711 A1 * | 7/2017 | Ohno .................... B60R 21/231 |
| 2017/0259774 A1 * | 9/2017 | Matsushita ............ B60N 2/427 |
| 2018/0194317 A1 * | 7/2018 | Barbat .................... B60N 2/90 |
| 2018/0222432 A1 * | 8/2018 | Schneider ............. B60R 21/214 |
| 2018/0236962 A1 * | 8/2018 | Ohno ................... B60R 21/207 |

FOREIGN PATENT DOCUMENTS

| | | | |
|---|---|---|---|
| EP | 2671802 A2 * | 12/2013 | ........... B60R 21/207 |
| JP | 08244553 A * | 9/1996 | |
| JP | 08268206 A * | 10/1996 | |
| JP | 2010125942 A | 6/2010 | |
| WO | 9812077 A1 | 3/1998 | |

\* cited by examiner

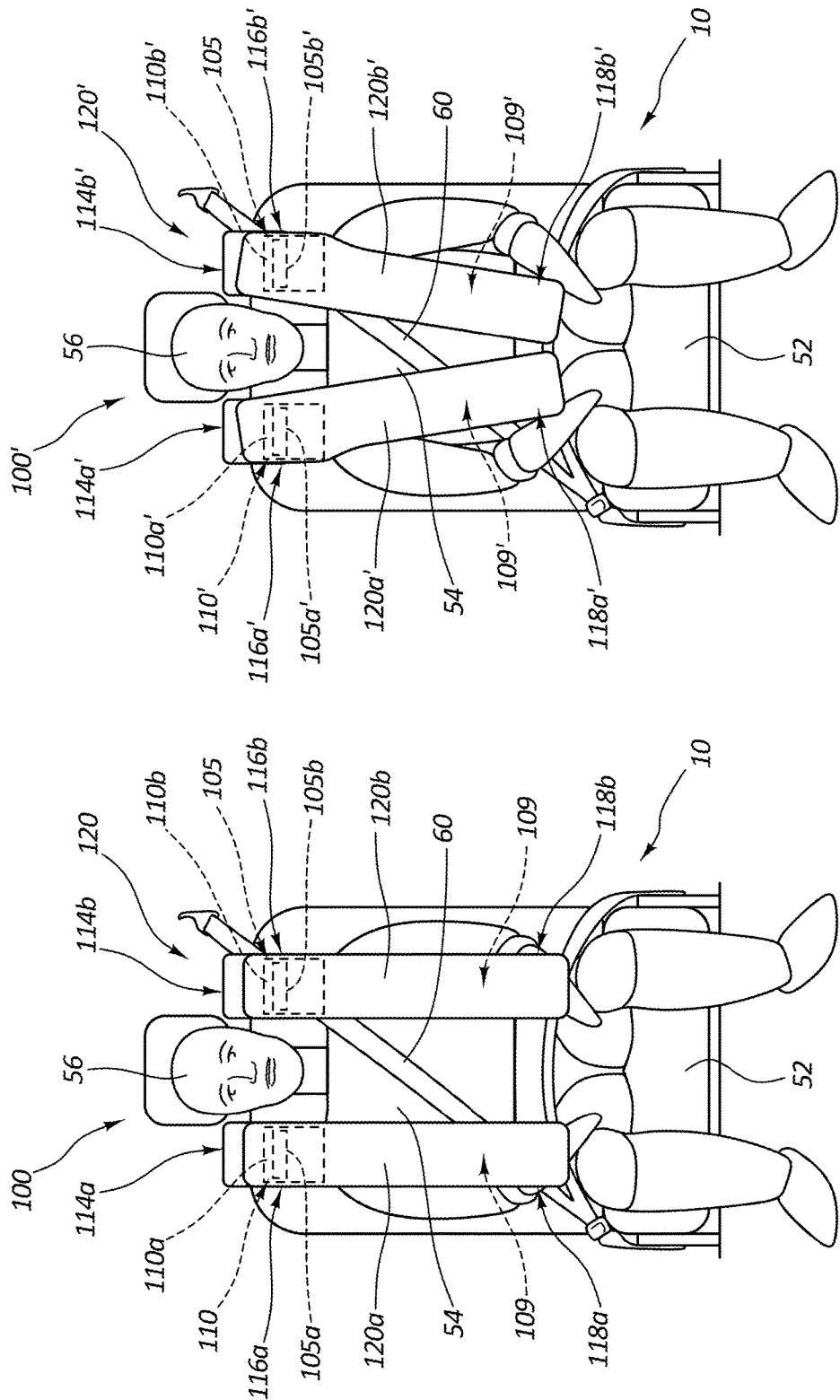

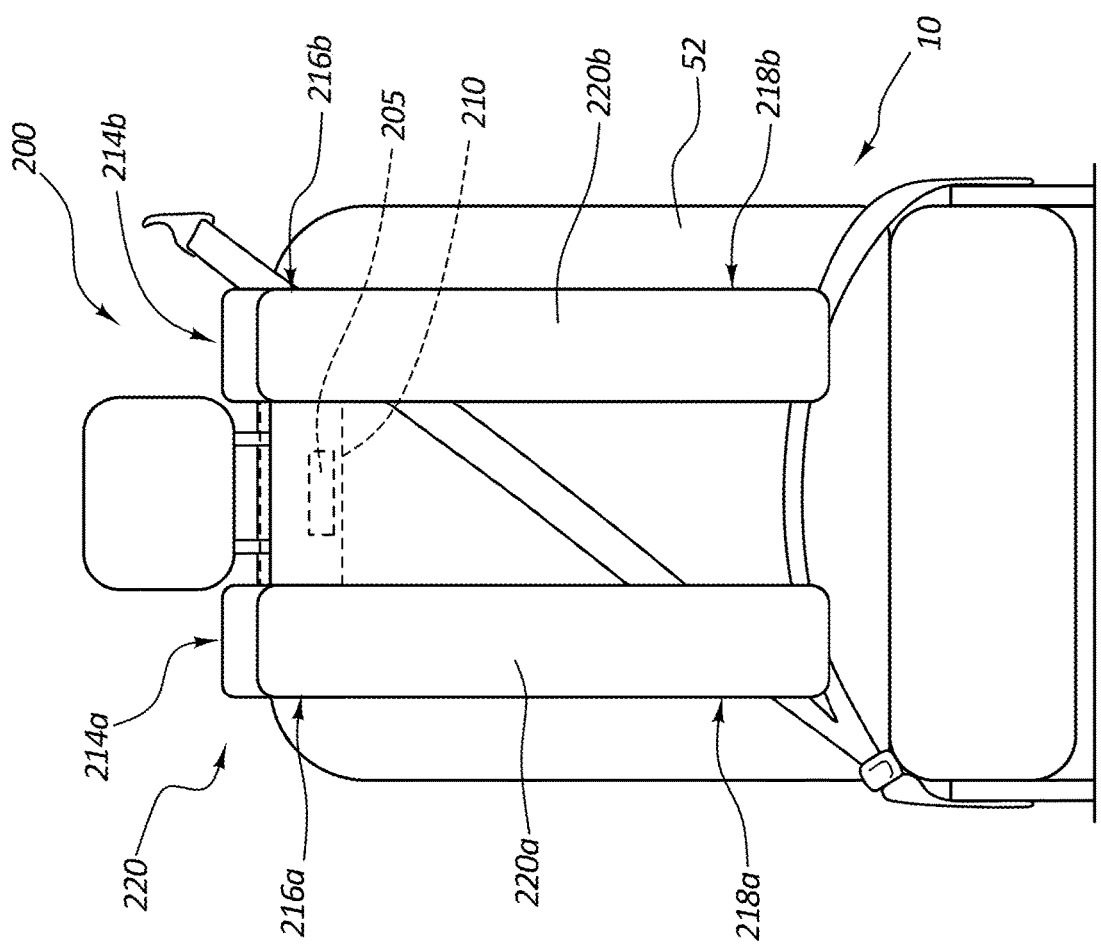

INFLATABLE AIRBAG HARNESS ASSEMBLIES

TECHNICAL FIELD

The present disclosure relates generally to the field of automotive protective systems. More specifically, the present disclosure relates to inflatable airbag harness assemblies that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 1D is a front view of the airbag assembly of FIG. 1A in a deployed state.

FIG. 1E is a front view of an airbag assembly, according to another embodiment of the present disclosure, in a deployed state.

FIG. 2 is a front view of an airbag assembly, according to another embodiment of the present disclosure, in a deployed state within a vehicle.

DETAILED DESCRIPTION

Figure 1A:
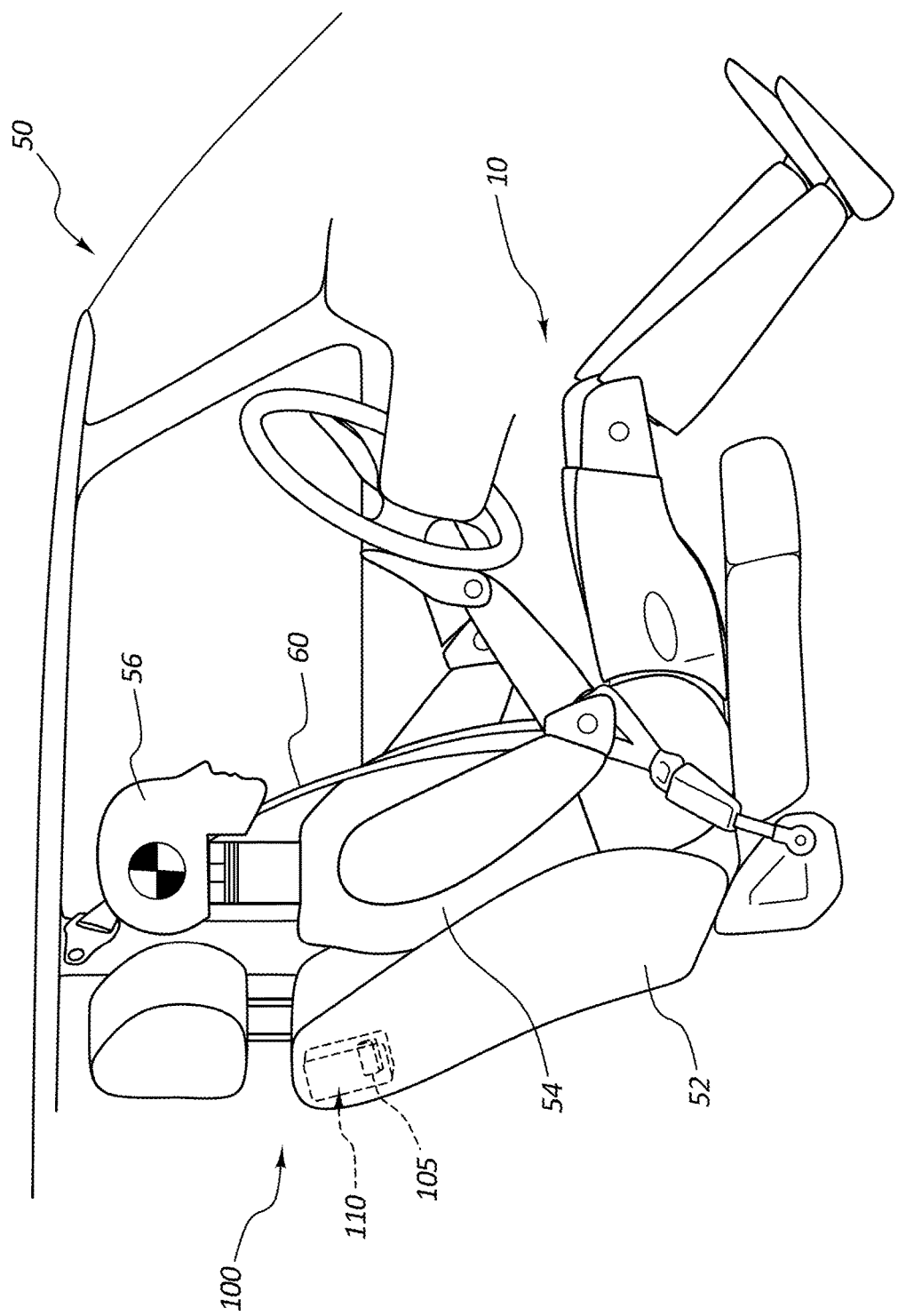
FIG. 1A is a side elevation view of an airbag assembly, according to one embodiment of the present disclosure, in a packaged state within a vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable airbag that deploys from a rear and/or a top portion of a seat to protect an occupant during a collision event. The disclosed airbag assemblies and airbag embodiments may be utilized in place of or in conjunction with other airbags, such as, for example, a front passenger airbag that is typically housed within the dashboard, driver airbags housed within the steering wheel, knee airbags, and side airbags. The disclosed airbag assemblies may also be used in conjunction with one or more of the rear seats of a vehicle (e.g., in an overhead position such as in a seat- or roof-mounted configuration). Further, the disclosed airbag assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger, and may include instruments (e.g., radio and/or climate controls) in a more central region thereof, although such instruments need not be present.

A "vehicle seating position" may be defined by a seat (e.g., front passenger seat, a front driver seat, a back seat) of a vehicle. A vehicle seating position may be the position in which an occupant is generally positioned when seated in a seat of a vehicle. A vehicle seating position may also be a position in which an occupant may be seated prior to and/or during a collision event or a position in which the vehicle and/or the seat is designed to transport an occupant.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The term "void" as used herein refers to a volume of space enclosed within the walls of a containing chamber. The containing chamber, or the walls thereof, may be fixed or flexible; hence, the volume of the space enclosed may also be fixed or flexible. For example, an airbag cushion may consist of fabric walls intended to contain a volume of inflation gases within the space between the walls.

The terms "proximal" and "distal" are directional terms used herein to refer to opposite or approximately opposite locations on an airbag cushion. The proximal end or proximal portion of an airbag cushion is the end or portion of the airbag cushion that is nearer the inflator or, in some instances, the housing when the airbag cushion is fully inflated. The distal end or portion is the end or portion of the airbag cushion opposite the proximal end or portion of the airbag cushion, or an end or portion more distant from the inflator or housing than the proximal end or portion. In other words, the terms "proximal" and "distal" are with reference to a point of attachment, such as a point of attachment of the airbag cushion at an airbag assembly housing, and/or a point of attachment of an airbag assembly at a seat back from which an airbag deploys. Specifically, "proximal" is situated toward such point of attachment, and "distal" is situated away from such point of attachment.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a roof of a vehicle, or in a structure above an occupant seating position, or within a seat-back portion of an occupant seat. An airbag assembly can mitigate injury to an occupant of a vehicle during a collision event by reducing the effect of impact of the occupant against structures (body-structure impact) within the vehicle (such as, e.g., a dashboard or door column).

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

Figure 1B:
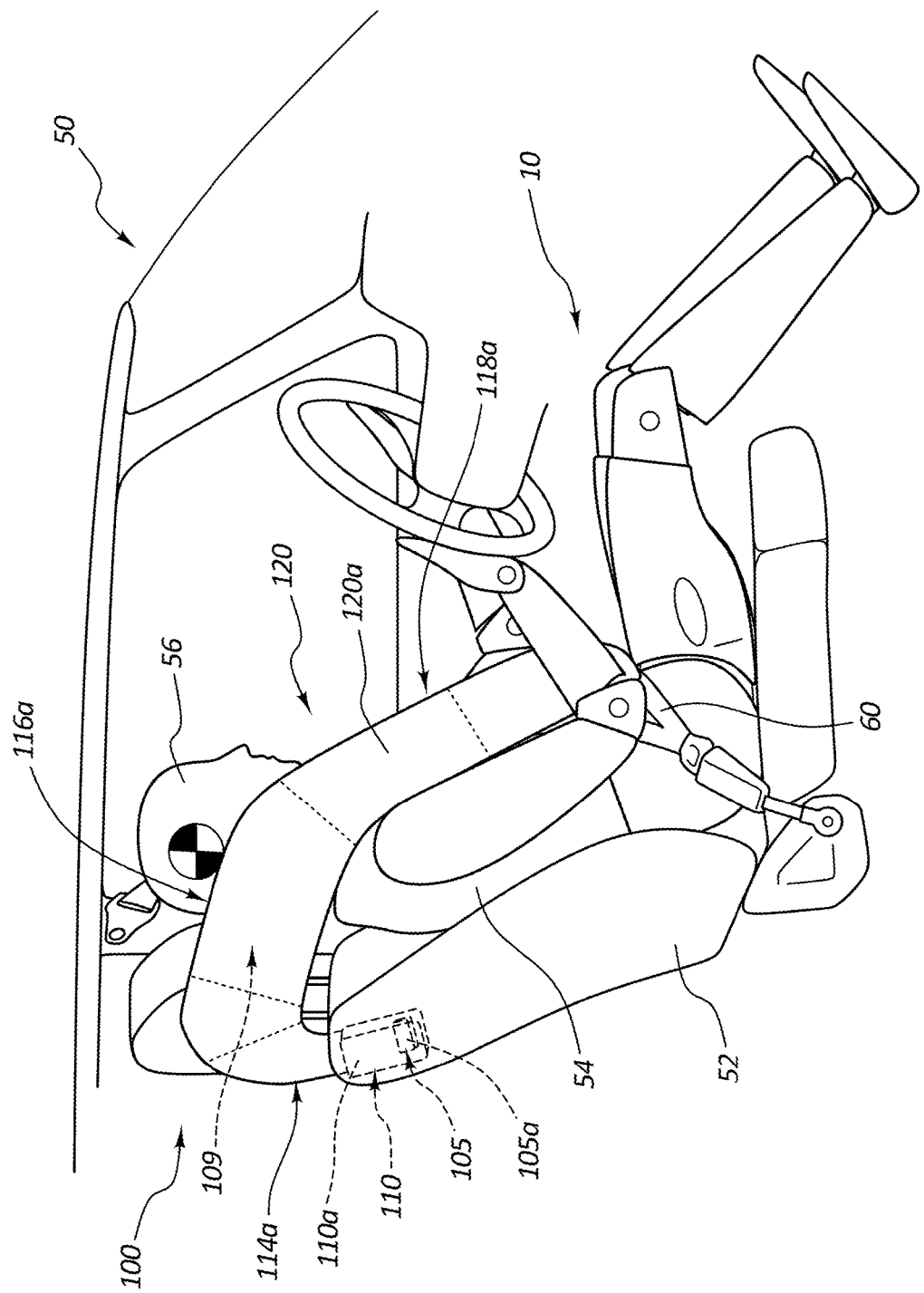
FIG. 1B is a side elevation view of the airbag assembly of FIG. 1A in a deployed state.
Figure 1C:
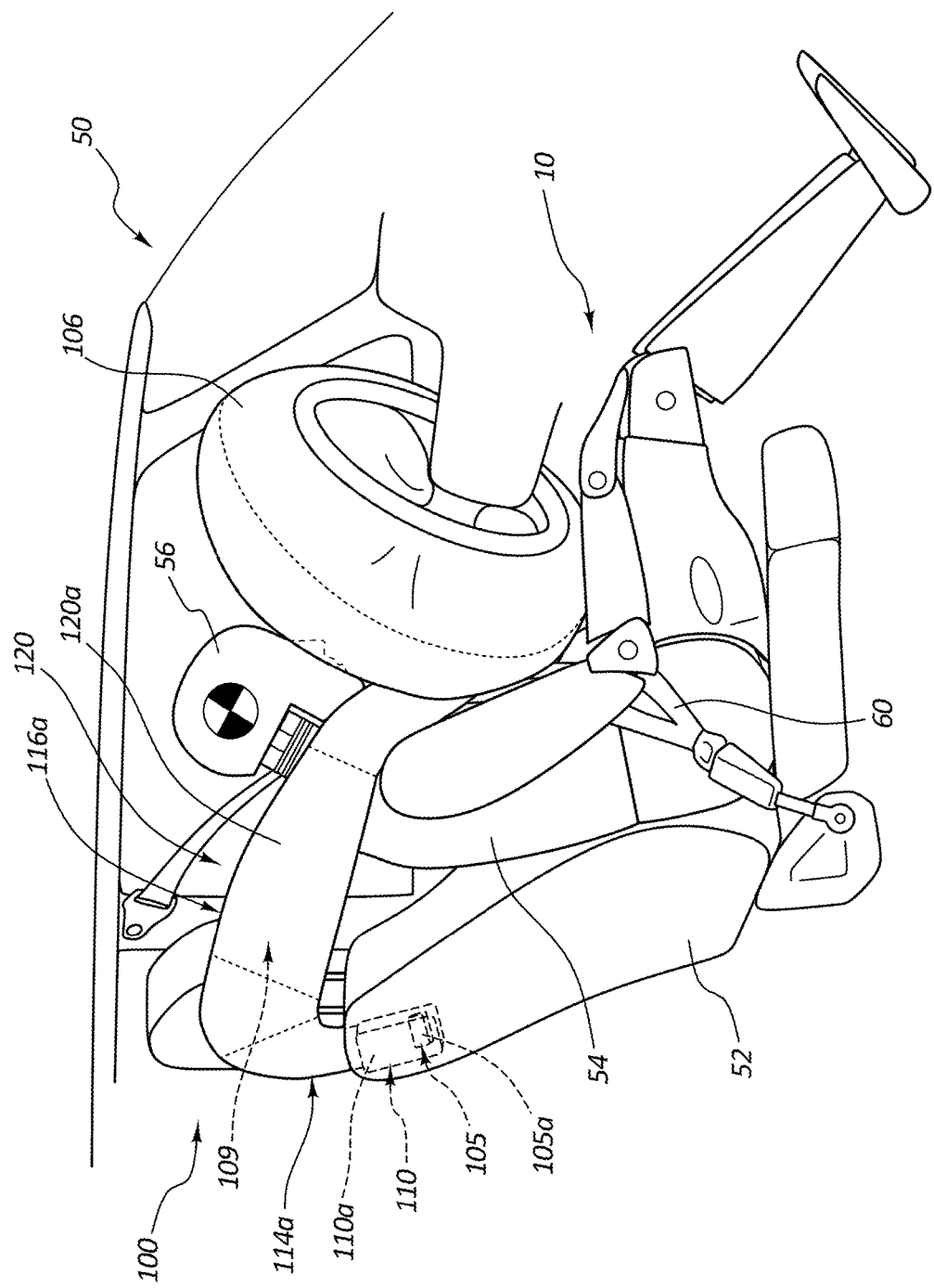
FIG. 1C is a side elevation view of the airbag assembly of FIG. 1A in a deployed state during a vehicle impact event.

FIGS. 1A-1D depict an embodiment of an inflatable airbag harness assembly or airbag assembly 100 mounted within a vehicle 50. An occupant 54 is positioned on a seat 52 (see FIGS. 1A, 1B, and 1D) or moving forward from the seat 52 relative to the vehicle 50 (e.g., during a vehicle impact event; see FIG. 1C). Further, in FIGS. 1A-1E, a seatbelt 60 is disposed around the occupant 54. In FIG. 1A, the airbag assembly 100 is in a packaged configuration or state within at least a portion of the seat 52, whereas in FIGS. 1B-1E, the airbag assembly 100 is in a deployed configuration or state. In FIG. 1C, a frontal airbag 106 is also depicted in a deployed configuration, and the occupant 54 is moving forward from the seat 52 relative to the vehicle 50 (e.g., due to a vehicle impact event). The frontal airbag 106 can be configured to deploy in a rearward direction relative to the vehicle (e.g., toward the occupant 52).

The airbag assembly 100 can include a housing 110, an inflator assembly 105, and an inflatable cushion 120, wherein the inflatable cushion 120 is coupled to the housing 110. The inflatable cushion 120 may include a first lateral chamber 120a and a second lateral chamber 120b. The housing 110 may include a first lateral housing portion 110a and a second lateral housing portion 110b. Likewise, the inflator assembly 105 may include a first inflator 105a and a second inflator 105b, wherein the first inflator 105a is coupled to the first lateral housing portion 110a, and the second inflator 105b is coupled to the second lateral housing portion 110b.

The airbag assembly 100 may be attached or coupled to the seat 52 of the vehicle 50 in any suitable manner. For example, as illustrated in FIGS. 1A-1E, the airbag assembly 100 may be disposed within an upper rear portion of the seat 52. In other embodiments, the airbag assembly 100 may be coupled to an exterior of the upper rear portion of the seat 52, the roof of the vehicle 50, or any other suitable structure of the vehicle 50. The airbag assembly 100 may be independent of or used independently of the seatbelt 60. The inflatable cushion 120 can define a void 109 that is configured to receive inflation gas (i.e., during a collision event or a vehicle impact event) from the inflator assembly 105 that may expand the inflatable cushion 120 from a packaged state within the housing 110 to a deployed state. In the absence of a collision event, the inflatable cushion 120 may be rolled, folded, or otherwise compressed to fit within the airbag housing 110. The inflatable cushion 120 may be formed from a cut and sewn cushion, a one-piece woven (OPW) or tubular webbing, or any suitable material. The inflator assembly 105 may be triggered to inflate the inflatable cushion 120 by one or more suitable sensors or devices within the vehicle 50. In some embodiments, the inflator assembly 105 may be triggered to inflate the inflatable cushion 120 when the frontal airbag 106 is triggered to inflate.

FIG. 1B illustrates the airbag assembly 100 in a deployed configuration, wherein the inflatable cushion 120 may be inflated with an inflation gas. When in a deployed configuration, the first and second lateral chambers 120a, 120b of the inflatable cushion 120 can each have a curved profile such that they are configured to be disposed around at least a portion of a torso of the occupant 54 in a vehicle seating position 10 (e.g., a position in which the occupant 54 is generally positioned when seated in the seat 52 of the vehicle 50). In various embodiments, the curved profile of the first and second lateral chambers 120a, 120b (e.g., the disposition of the deployed lateral chambers 120a, 120b around the occupant's torso) may be formed by one or more of: angling the housing 110 at or adjacent the rear of the seat 52; shaping the material forming the first and second lateral chambers 120a, 120b; using internal tethers (i.e., disposed within at least a portion of the void 109 of the first and second lateral chambers 120a, 120b); using sewn "pleats" (e.g., gathered material) in the first and second lateral chambers 120a, 120b to form a shorter length on the lower surface as compared to the upper surface; or a combination thereof.

The first lateral chamber 120a can include a proximal portion 114a, a middle portion 116a, and a distal portion 118a. Likewise, the second lateral chamber 120b can include a proximal portion 114b, a middle portion 116b, and a distal portion 118b. The proximal portions 114a, 114b can be coupled to the housing 110 at a first end, and coupled to the middle portions 116a, 116b, respectively, at a second end. Furthermore, the middle portions 116a, 116b can be coupled to the proximal portions 114a, 114b, respectively, at a first end and to the distal portions 118a, 118b, respectively, at a second end. In certain embodiments, when the first lateral chamber 120a is inflated, the middle portion 116a can be disposed over a first shoulder and adjacent a first side of a head 56 of the occupant 54. The distal portion 118a can be coupled to the middle portion 116a at a first end and can be closed or sealed at a second end (i.e., a distal end). When the first lateral chamber 120a is inflated, the distal portion 118a can be disposed along at least a portion of a front of the torso of the occupant 54. For example, the distal portion 118a may extend from a position adjacent a shoulder of the occupant 54 to a position adjacent a lap of the occupant 54.

As shown in FIGS. 1D and 1E, when the second lateral chamber 120b is inflated, the middle portion 116b can be disposed over a second shoulder and adjacent a second side of the head 56 of the occupant 54. The distal portion 118b can be coupled to the middle portion 116b at a first end and can be closed or sealed at a second end (i.e., a distal end). When the second lateral chamber 120b is inflated, the distal portion 118b can be disposed along at least a portion of a front of the torso of the occupant 54. For example, the distal portion 118b may extend from a position adjacent a shoulder of the occupant 54 to a position adjacent a lap of the occupant 54.

The proximal portions 114a, 114b of the first and second lateral chambers 120a, 120b of the inflatable cushion 120 may be coupled to the housing 110 (e.g., to the first and second inflators 105a, 105b, respectively) such that the proximal portions 114a, 114b are configured to receive the inflation gas from the inflator assembly 105. The portions of the first and second lateral chambers 120a, 120b (i.e., the proximal portions 114a, 114b, the middle portions 116a, 116b, and the distal portions 118a, 118b) may be in fluid communication with each other such that the proximal portions 114a, 114b are configured to allow or direct the inflation gas to flow through to the middle portions 116a, 116b, and the middle portions 116a, 116b are configured to allow or direct the inflation gas to flow through to the distal portions 118a, 118b, respectively.

During a collision event, the proximal portions 114a, 114b may inflate and the pressure from the inflation gas may cause the first and second lateral chambers 120a, 120b to exit the first and second lateral housing portions 110a, 110b, respectively. Furthermore, the middle and distal portions 116a, 116b, 118a, 118b can also be configured to inflate. In FIG. 1B, the airbag assembly 100 is configured such that the first and second lateral chambers 120a, 120b exit the top portions of the first and second lateral housing portions 110a, 110b respectively. In various embodiments, the airbag assembly 100 may be configured such that the first and second lateral chambers 120a, 120b exit the first and second lateral housing portions 110a, 110b from other suitable portions of the first and second lateral housing portions 110a, 110b respectively—for example, a rear of the first and second lateral housing portions 110a, 110b, respectively.

FIG. 1C illustrates the airbag assembly 100 in a deployed configuration, wherein the frontal airbag 106 is also in a deployed configuration and the occupant 54 is moving from the vehicle seating position 10 in a forward direction relative to the vehicle 50 during a vehicle impact event. In various embodiments, the frontal airbag 106 may not deploy during the vehicle impact event or the vehicle 50 may lack the frontal airbag 106. The inflatable cushion 120 of the airbag assembly 100 may alleviate the effects of an impact on the occupant 54. Further, the airbag assembly 100 may limit the force exerted by the seatbelt 60 on the occupant 54.

With continued reference to FIG. 1C, upon movement of the occupant 54 in a forward direction from the vehicle seating position 10, the inflatable cushion 120 can be configured such that the first lateral chamber 120a may receive at least a portion of a first side of the torso of the occupant 54, and the second lateral chamber 120b may receive at least a portion of a second side of the torso of the occupant 54, and the frontal airbag 106 can be configured to receive at least a portion of the head 56 of the occupant 54. Specifically, the airbag assembly 100 can be configured such that when a frontal vehicle impact event occurs, the distal portion 118a of the first lateral chamber 120a receives at least a portion of a first side of the torso of the occupant 54, and the distal portion 118b of the second lateral chamber 120b receives at least a portion of a second (i.e., an opposite) side of the torso of the occupant 54.

In certain embodiments, during an oblique vehicle impact event, the occupant 54 may move in both a forward direction and a lateral direction relative to the vehicle 50 (e.g., from the vehicle seating position 10). For example, if an impact occurs on a right lateral side of the vehicle 50, the occupant 54 may move forward and to the right from the vehicle seating position 10 relative to the vehicle 50. Accordingly, the inflatable cushion 120 may be configured such that the first lateral chamber 120a receives at least a portion of the neck, the head 56, and/or the shoulder of the occupant 54.

FIG. 1D is a front view of the airbag assembly 100 in the deployed configuration. As shown, the airbag assembly 100 can include the first and second lateral chambers 120a, 120b, wherein the first and second lateral chambers 120a, 120b may be disposed opposite of each other relative to the seat 52. Specifically, the first lateral chamber 120a may be disposed at or adjacent a first side of the vehicle occupant 54, and the second lateral chamber 120b may be disposed at or adjacent a second side of the vehicle occupant 54.

With continued reference to FIG. 1D, the first and second lateral chambers 120a, 120b may be configured such that the distal portions 118a, 118b of the first and second lateral chambers 120a, 120b, respectively, are substantially parallel with each other. For example, the first end of the distal portion 118a of the first lateral chamber 120a may have a distance from the first end of the distal portion 118b of the second lateral chamber 120b that is substantially equal to the distance from the second end (i.e., the distal end) of the distal portion 118a of the first lateral chamber 120a to the second end (i.e., the distal end) of the distal portion 118b of the second lateral chamber 120b.

FIG. 1E is a front view of an airbag assembly 100'. In contrast to the first and second lateral chambers 120a, 120b, as depicted in FIG. 1D, the first and second lateral chambers 120a', 120b' of FIG. 1E are configured such that the distal portions 118a', 118b' of the lateral chambers 120a', 120b' are not parallel. Specifically, the distal portions 118a', 118b' of the lateral chambers 120a', 120b' may be configured such that the distal portion 118a' of the first lateral chamber 120a' is angled toward the distal portion 118b' of the second lateral chamber 120*b*'. For example, the distance from the first end of the distal portion 118*a*' of the first lateral chamber 120*a*' to the first end of the distal portion 118*b*' of the second lateral chamber 120*b*' may be larger than the distance from the second end (i.e., the distal end) of the distal portion 118*a*' of the first lateral chamber 120*a*' to the second end (i.e., the distal end) of the distal portion 118*b*' of the second lateral chamber 120*b*'.

During a collision event or a vehicle impact event, the occupant 54 may move forward from the vehicle seating position 10 relative to the vehicle 50, and the first and second lateral chambers 120*a*, 120*b* may each receive at least a portion of the torso of the occupant 54. Specifically, the airbag assembly 100 may be configured such that when a frontal vehicle impact occurs, the distal portions 118*a*, 118*b* of the first and second lateral chambers 120*a*, 120*b* receive at least a portion of the torso of the occupant 54. For example, with reference to FIG. 1D, upon movement of the vehicle occupant 54 from the vehicle seating position 10 relative to the vehicle 50, the airbag assembly 100 can deploy and at least a portion of the distal portion 118*a* of the first lateral chamber 120*a* of the inflatable cushion 120 can receive at least a portion of a first side (e.g., a right side) of the occupant's 54 torso, and at least a portion of the distal portion 118*b* of the second lateral chamber 120*b* of the inflatable cushion 120 can receive at least a portion of a second side (e.g., a left side) of the occupant's 54 torso. Under analogous conditions, the airbag assembly illustrated in FIG. 1E may perform similarly to the airbag assembly illustrated in FIG. 1D; however, as the distal portions 118*a*', 118*b*' of the first and second lateral chambers 120*a*', 120*b*', respectively, are angled toward each other in FIG. 1E, different portions of the torso of the occupant 54 may be received by the first and second lateral chambers 120*a*', 120*b*'.

In either a frontal or oblique impact event, the airbag assembly 100 may be configured such that the first and second lateral chambers 120*a*, 120*b* may receive a portion of the force of the occupant 54 while the seatbelt 60 may receive another portion of the force of the occupant 54, wherein the first and second lateral chambers 120*a*, 120*b* may lessen the force of the seatbelt 60 on the occupant 54. Further, whether the first and second lateral chambers 120*a*, 120*b* are in a packaged state or in a deployed state, the airbag assembly 100 may function independent of the seatbelt 60. The first and second lateral chambers 120*a*, 120*b* may be configured to exert a force on the occupant 54 in a vehicle collision event such that, with or without a seatbelt 60 being fastened around the occupant 54, the movement of the occupant 54 may be substantially restricted.

In certain embodiments, the first and second lateral chambers 120*a*, 120*b* can restrain an occupant moving in a forward, lateral, and/or oblique direction from the vehicle seating position 10 relative to the vehicle. Pressure inside the first and second lateral chambers 120*a*, 120*b* (e.g., due to the inflation gas within the void 109) can apply a downward and/or a rearward force on the shoulders and/or the torso of the occupant 54. In some embodiments, interaction (e.g., pressure and friction) between the frontal airbag 106 and the first and second lateral chambers 120*a*, 120*b* can also apply a rearward force on the occupant 54.

FIG. 2 depicts an embodiment of an inflatable airbag harness assembly or airbag assembly 200 that resembles the airbag assemblies 100, 100' described above in certain respects. Accordingly, like features are designated with like reference numerals, with the leading digits incremented to "2." For example, the embodiment depicted in FIG. 2 includes an airbag assembly 200 that may, in some respects, resemble the airbag assembly 100 of FIGS. 1A-1D or the airbag assembly 100' of FIG. 1E. Relevant disclosure set forth above regarding similarly identified features thus may not be repeated hereafter. Moreover, specific features of the airbag assemblies 100, 100' and related components shown in FIGS. 1A-1E may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag system and related components depicted in FIG. 2. Any suitable combination of the features, and variations of the same, described with respect to the airbag assemblies 100, 100' and related components illustrated in FIGS. 1A-1E can be employed with the airbag assembly 200 and related components of FIG. 2, and vice versa. This pattern of disclosure applies equally to further embodiments depicted in subsequent figures and described hereafter, wherein the leading digits may be further incremented.

FIG. 2 is a front view of the airbag assembly 200, where the airbag assembly 200 is in a deployed configuration. The airbag assembly 200 may include an inflator assembly 205, a housing 210, and an inflatable cushion 220. As illustrated, the inflatable cushion 220 can include a first lateral chamber 220*a* and a second lateral chamber 220*b*. In various embodiments, the first lateral chamber 220*a* may be coupled to a first end (e.g., a right end) of the housing 210, and the second lateral chamber 220*b* may be coupled to a second, opposite end (e.g., a left end) of the housing 210. Per the embodiment depicted in FIG. 2, the first and second lateral chambers 220*a*, 220*b* may be configured to fit within a single housing 210 (when they are not in a deployed state), and may receive an inflation gas (upon deployment) during a collision event from a single inflator assembly 205. In other embodiments, the first and second lateral chambers 220*a*, 220*b* may be configured to fit within a single housing 210 (when they are not in a deployed state) and receive the inflation gas (upon deployment) during a collision event from more than one inflator assembly 205.

According to the embodiment of FIG. 2, the airbag assembly 200 may be configured such that the housing 210 is disposed within at least a portion of the upper rear portion of the seat 52. In various embodiments, the airbag assembly 200 may be configured such that the housing 210 can be disposed on or within another suitable portion of the vehicle 50, for example, on or within the roof of the vehicle 50, the exterior of the rear of the seat 52, etc. As illustrated, the inflator assembly 205 may be disposed within at least a portion of the housing 210. In various embodiments, the inflator assembly 205 may be coupled to but disposed outside of the housing 210.

The first and second lateral chambers 220*a*, 220*b* can each include proximal portions 214*a*, 214*b*, middle portions 216*a*, 216*b*, and distal portions 218*a*, 218*b*, respectively. The proximal portions 214*a*, 214*b* of the first and second lateral chambers 220*a*, 220*b* of the inflatable cushion 220 may be coupled to the housing 210 and the inflator assembly 205 such that the proximal portions 214*a*, 214*b* are configured to receive the inflation gas from the inflator assembly 205 during a collision event or vehicle impact event. Each portion of the first and second lateral chambers 220*a*, 220*b* (i.e., the proximal, middle, and distal portions 214*a*, 214*b*, 216*a*, 216*b*, 218*a*, 218*b*) may be in fluid communication with each other such that the proximal portions 214*a*, 214*b* are configured to allow or direct the inflation gas to flow through to the middle portions 216a, 216b, and the middle portions 216a, 216b are configured to allow or direct the inflation gas to flow through to the distal portions 218a, 218b, respectively. Further, the first lateral chamber 220a may be in fluid communication with the second lateral chamber 220b, wherein if one of the lateral chambers 220a, 220b is inflated before the other, the inflation gas may flow from the more pressurized of the lateral chambers 220a, 220b through the housing 210 to the less pressurized of the lateral chambers 220a, 220b until both lateral chambers 220a, 220b are substantially equally inflated.

The portions of the first and second lateral chambers 220a, 220b may be connected such that the proximal portions 214a, 214b can be coupled to the first and second lateral sides of the housing 210 at a first end and coupled to the middle portions 216a, 216b respectively at a second end; the middle portions 216a, 216b can be coupled to the proximal portions 214a, 214b at a first end and coupled to the distal portions 218a, 218b, respectively, at a second end; and the distal portions 218a, 218b can be coupled to the middle portions 216a, 216b at a first end and can be closed or sealed at a second end (i.e., a distal end). The first and second lateral chambers 220a, 220b may each have curved profiles such that, when they are deployed, they may inflate and take shape around the vehicle occupant 54.

The first and second lateral chambers 220a, 220b may be configured such that, when they are in a deployed state, they can be symmetrical about the seat 52. In one embodiment, when first and second lateral chambers 220a, 220b are deployed, the first lateral chamber 220a may be disposed at a first lateral side of the seat 52, and the second lateral chamber 220b may be disposed at a second lateral side of the seat 52 such that the distal portion 218a of the first lateral chamber 220a may be substantially parallel to the distal portion 218b of the second lateral chamber 220b. In an alternative embodiment, the first and second lateral chambers 220a, 220b may be configured such that, when they are deployed, they are symmetrical about the seat 52, but do not have distal portions 218a, 218b that are parallel. For example, according to another embodiment, when the first and second lateral chambers 220a, 220b are deployed, the first lateral chamber 220a may be disposed at a first lateral end of the seat 52, and the second lateral chamber 220b may be disposed at a second lateral end of the seat 52 such that the distal portion 218a of the first lateral chamber 220a may be angled or directed towards the distal portion 218b of the second lateral chamber 220b.

Figure 3A:
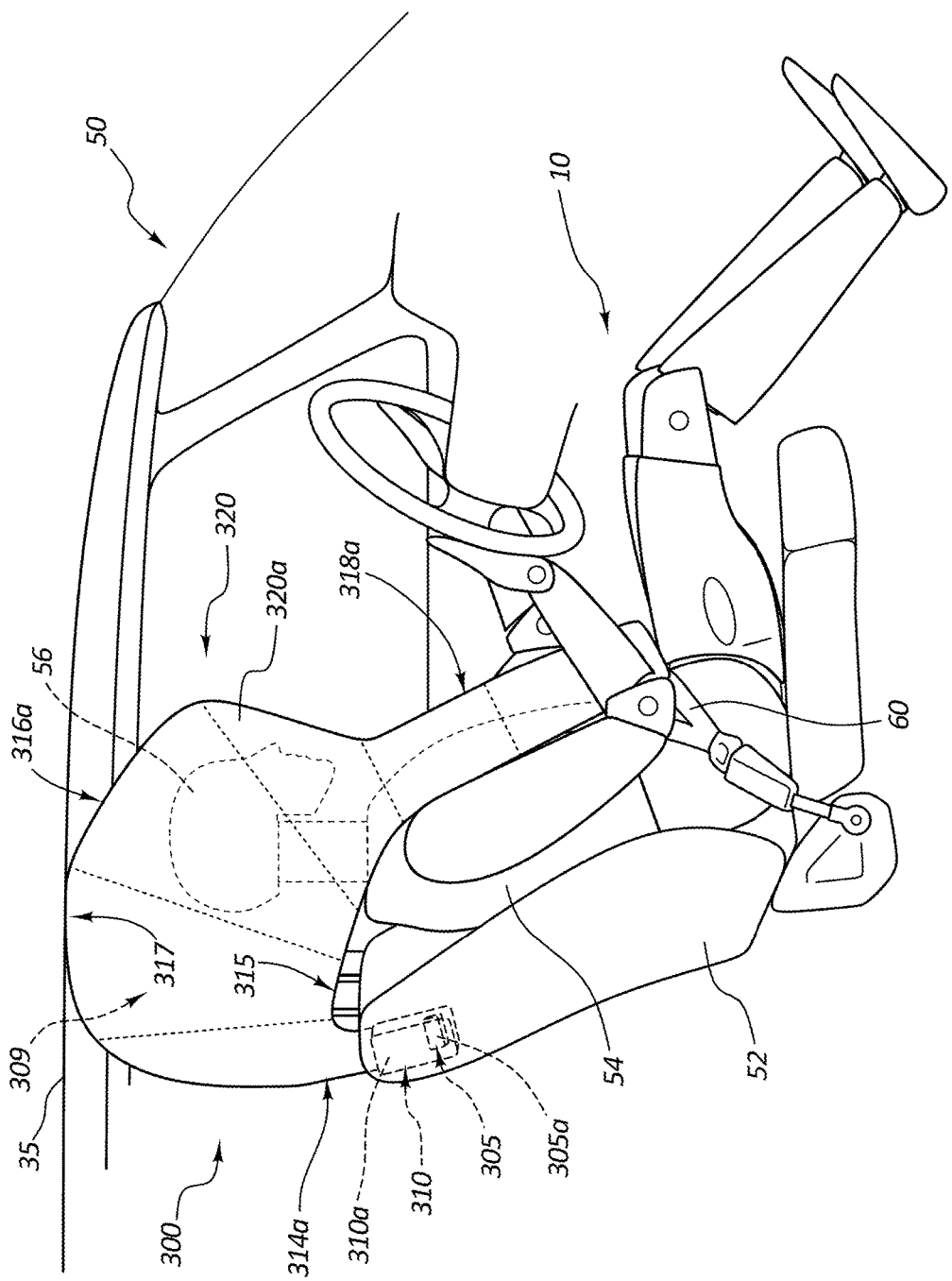
FIG. 3A is a side elevation view of an airbag assembly, according to another embodiment of the present disclosure, in a deployed state within a vehicle.
Figure 3B:
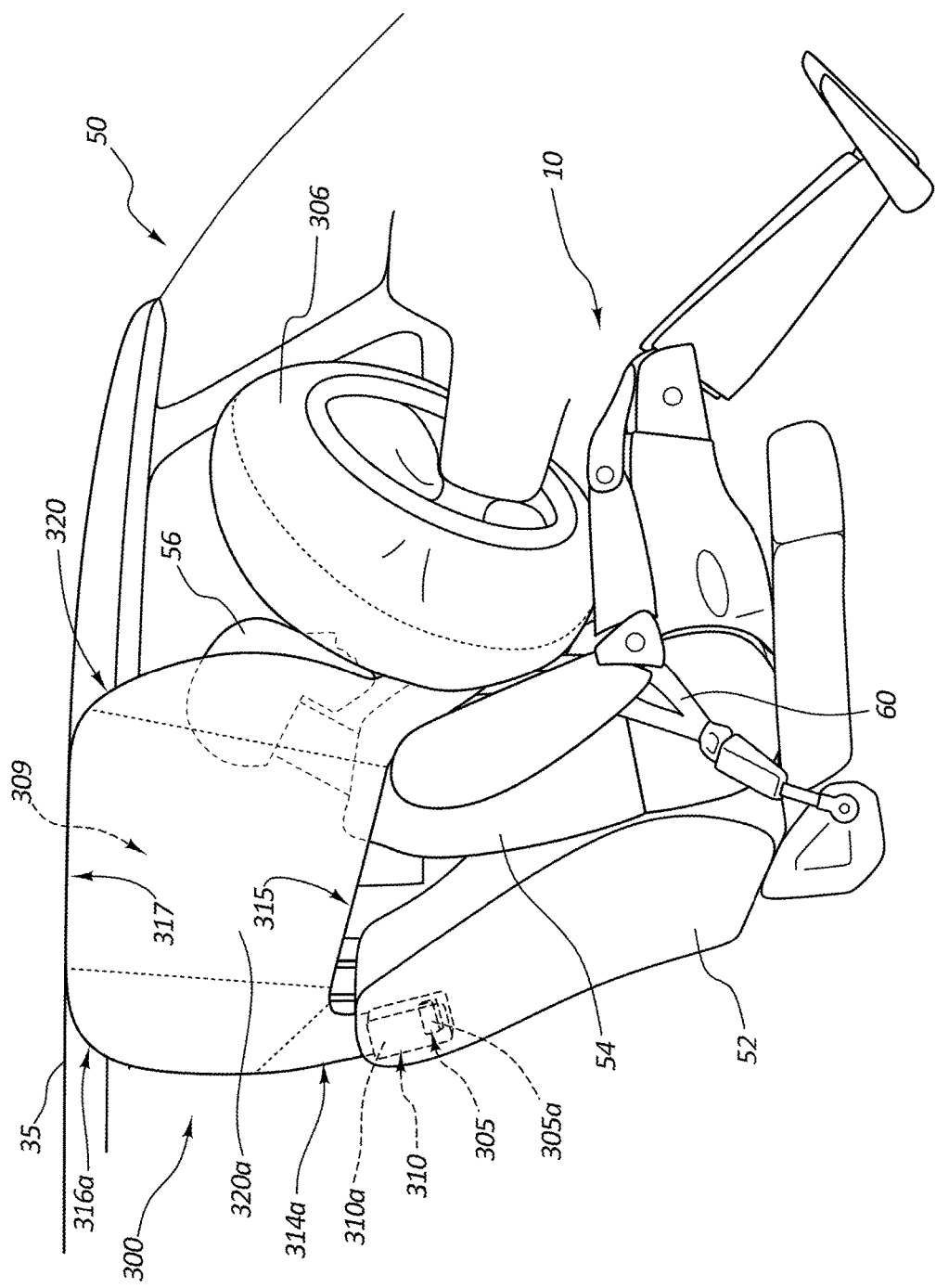
FIG. 3B is a side elevation view of the airbag assembly of FIG. 3A in a deployed state during a vehicle impact event.
Figure 3C:
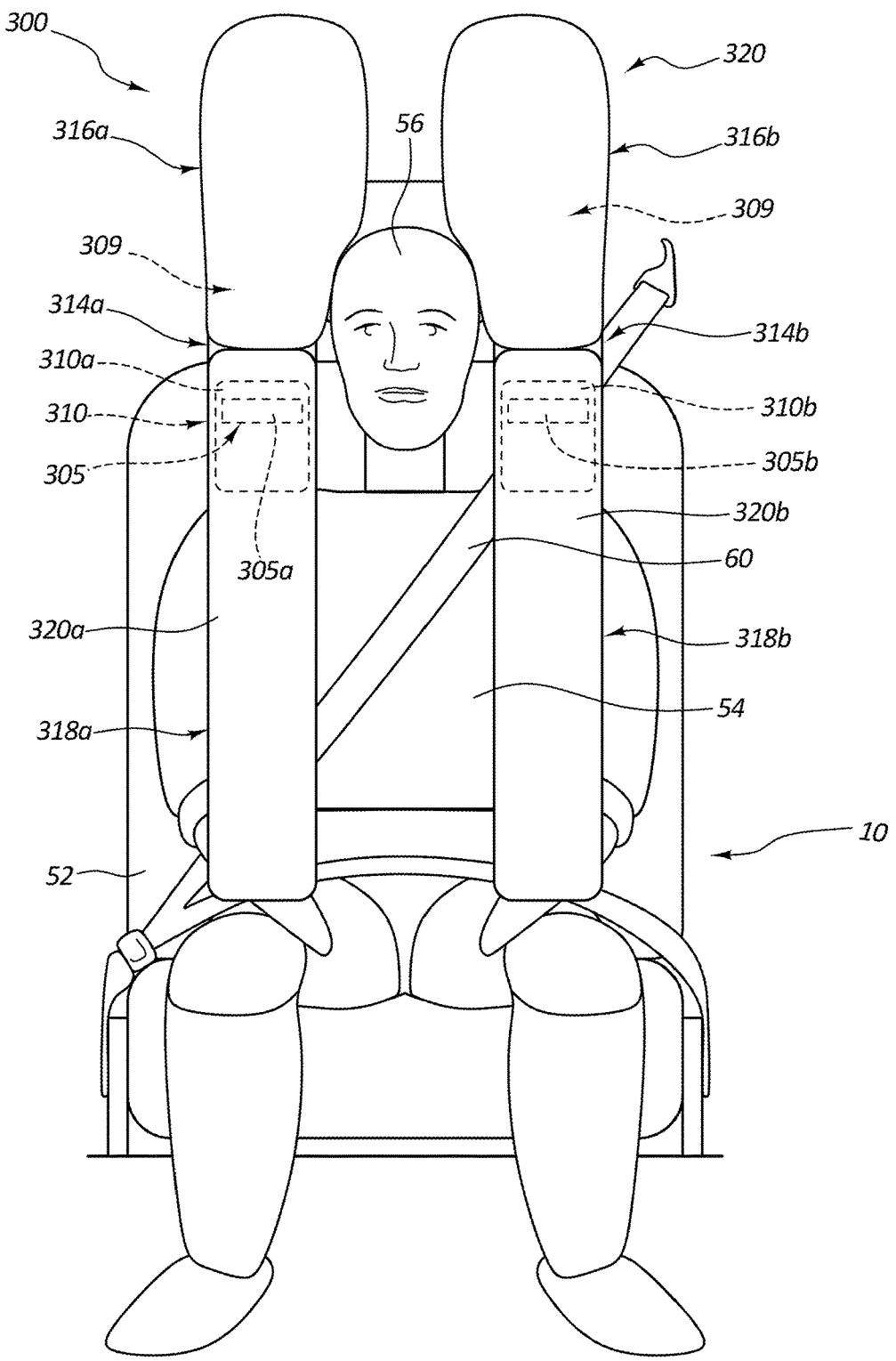
FIG. 3C is a front view of the airbag assembly of FIG. 3A in a deployed state.

FIGS. 3A-3C depict an inflatable airbag harness assembly or airbag assembly 300 in a deployed configuration or state around a vehicle occupant 54, where the occupant 54 is on a seat 52 (see FIGS. 3A and 3C) or moving forward from the seat 52 relative to the vehicle 50 (e.g., during a collision event or vehicle impact event; see FIG. 3B). Further, the occupant 54 is in a vehicle 50, and a seatbelt 60 is disposed around the occupant 54. In FIGS. 3A and 3C, the occupant 54 is in the vehicle seating position, and in FIG. 3B the occupant 54 is moving forward from the vehicle seating position (e.g., due to a vehicle impact event) into a deployed frontal airbag 306.

As depicted, the airbag assembly 300 can include a housing 310, an inflatable cushion 320, and an inflator assembly 305, wherein the inflatable cushion 320 is coupled to the housing 310. As depicted, the inflatable cushion 320 may include a first lateral chamber 320a and a second lateral chamber 320b. The housing 310 may include a first lateral housing portion 310a and a second lateral housing portion 310b. The first lateral housing portion 310a can be disposed at a first lateral side of the upper rear portion of the seat 52, and the second lateral housing portion 310b can be disposed at a second lateral side of the upper rear portion of the seat 52. Further, the inflator assembly 305 may include a first inflator 305a and a second inflator 305b, wherein the first inflator 305a is coupled to the first lateral housing portion 310a, and the second inflator 305b is coupled to the second lateral housing portion 310b. In some embodiments, the airbag assembly 300 may include a single housing and/or a single inflator assembly.

In various embodiments, the airbag assembly 300 may be positioned such that it can be disposed within the upper rear portion of the seat 52. In alternative embodiments, the airbag assembly 300 may be positioned on a portion of an exterior of the seat 52, on a portion of a roof 35 of the vehicle 50, on a supporting structure near the occupant 54, or to any other suitable structure of the vehicle 50.

The inflatable cushion 320 can define a void 309 that is configured to receive an inflation gas (i.e., during a collision event or a vehicle impact event) from the inflator assembly 305 that may expand the inflatable cushion 320 from a packaged state within the housing 310 to a deployed state. The inflator assembly 305 may be coupled to the housing 310 such that the inflator assembly 305 and the housing 310 can be in fluid communication with each other. The first and second lateral chambers 320a, 320b may also be coupled to the first and second lateral housing portions 310a, 320b, respectively, such that the first and second lateral chambers 320a, 320b and the first and second lateral housing portions 310a, 310b can be in fluid communication with each other. The first and second lateral chambers 320a, 320b may each include a proximal portion 314a, 314b, a middle portion 316a, 316b, and a distal portion 318a, 318b. The portions of the first and second lateral chambers 320a, 320b (i.e., the proximal, middle, and distal portions 314a, 314b, 316a, 316b, 318a, 318b) may be connected such that the proximal portions 314a, 314b can be coupled to the first and second housing portions 310a, 310b at a first end and to the middle portions 316a, 316b, respectively, at a second end; the middle portions 316a, 316b can be coupled to the proximal portions 314a, 314b at a first end and to the distal portions 318a, 318b, respectively, at a second end; and the distal portions 318a, 318b can be coupled to the middle portions 316a, 316b at a first end and can be closed or sealed at a second end (i.e., a distal end). Further, the proximal, middle, and distal portions 314a, 314b, 316a, 316b, 318a, 318b may be connected such that they can be in fluid communication with each other.

The inflatable cushion 320 may be configured such that when the first and second lateral chambers 320a, 320b are in a deployed state, the middle portion 316a of the first lateral chamber 320a may be disposed at or around a first (e.g., a right) shoulder and a first (e.g., a right) side of the head 56 of the occupant 54, and the distal portion 318a may be disposed at or around a first side (e.g., a right side) of the torso of the occupant 54. Further (as shown in FIGS. 3A and 3B), when the first and second lateral chambers 320a, 320b are in a deployed state, the middle portion 316b of the second lateral chamber 320b may be disposed at or around a second (e.g., a left) shoulder and a second (e.g., a left) side of the head 56 of the occupant 54, and the distal portion 318b may be disposed at or around a second side (e.g., a left side) of the torso of the occupant 54.

Additionally, when the first and second lateral chambers 320a, 320b are in a deployed state, the middle portions 316a, 316b can each have a lower edge 315 and an upper edge 317, wherein the lower edge 315 can extend along a position adjacent a shoulder of the occupant 54 in the vehicle seating position 10, and the upper edge 317 can extend along a position adjacent the roof 35 of the vehicle 50. When inflated, the upper edges 317 of the middle portions 316a, 316b of the first and second lateral chambers 320a, 320b may press against or exert an upward force on the roof 35 of the vehicle 50 such that the lower edges 315a, 315b of the middle portions 316a, 316b of the first and second lateral chambers 320a, 320b may press against or exert a downward force on the shoulders of the occupant 54.

The first and second lateral chambers 320a, 320b can be configured such that when they are in a deployed state or configuration, they can maintain a curved profile and/or direction around the occupant's torso.

In various embodiments, the first and second lateral chambers may be configured such that during a collision event or vehicle impact event, either or both of middle portions 316a, 316b may receive at least a portion of the head 56 and/or shoulders of the vehicle occupant 54, and either or both distal portions 318a, 318b may receive at least a portion of the torso of the occupant 54.

With reference to FIG. 3C, the airbag assembly 300 can include the first and second lateral chambers 320a, 320b, wherein the first and second lateral chambers 320a, 320b may be disposed opposite of each other relative to the seat 52. Specifically, the first lateral chamber 320a may be disposed at or adjacent a first side of the vehicle occupant 54, and the second lateral chamber 320b may be disposed at or adjacent a second side of the vehicle occupant 54, such that the first and second lateral chambers 320a, 320b are substantially symmetrical to each other about the seat 52.

Upon movement of the occupant 54 in a forward direction from the vehicle seating position 10, the inflatable cushion 320 can be configured to receive at least a portion of the torso of the occupant 54, and the frontal airbag 306 can be configured to receive at least a portion of the head 56 of the occupant 54. Specifically, the airbag assembly 300 can be configured such that when a collision event occurs, the distal portion 318 of the inflatable cushion 320 receives at least a portion of the torso of the occupant 54.

In certain embodiments, during an oblique collision or oblique vehicle impact, the occupant 54 may move both in a forward direction and a lateral direction relative to the vehicle 50 (e.g., from the vehicle seating position 10), wherein the middle portion 316 of the inflatable cushion 320 may receive at least a portion of the head 56 and/or shoulders of the occupant 54, and the distal portion 318 of the inflatable cushion 320 may receive at least a portion of the torso of the occupant 54. For example, if an impact occurs on a right lateral side of the vehicle 50, the occupant 54 may move forward and to the right from the vehicle seating position 10 relative to the vehicle 50. Accordingly, the inflatable cushion 320 may be configured such that the middle portion 316a of the first lateral chamber 320a receives at least a portion of the right side of the neck, the right side of the head 56, and/or the right shoulder of the occupant 54.

In various embodiments, the inflatable cushion 320 may be configured such that the first and second lateral chambers 320a, 320b alleviate the force exerted by the seatbelt 60 on the occupant 54. Further, the inflatable cushion 320 may be configured such that the motion of the occupant 54 may be substantially restricted independent of the effects of the seatbelt 60 (i.e., the airbag assembly 300 may restrain the occupant 54 even if the seatbelt 60 is not fastened around the occupant 54).

With reference to FIG. 3C, when deployed, the first and second lateral chambers 320a, 320b may be configured such that the distal portions 118a, 118b of the first and second lateral chambers 320a, 320b are substantially parallel with each other. In other embodiments, when deployed, the first and second lateral chambers 320a, 320b may be configured such that the distal portions 318a, 318b of the first and second lateral chambers 320a, 320b are not parallel with each other.

For each of the first and second lateral chambers 320a, 320b, the lower edge 315 of the middle portions 316a, 316b may extend along a position adjacent a shoulder of the occupant 54 in the vehicle seating position 10, and the upper edge 317 of the middle portions 316a, 316b may extend along a position above the head 56 of the occupant 54. For example, the middle portion 316a of the first lateral chamber 320a may have a lower edge that may extend along a position adjacent a first shoulder (e.g., a right shoulder) of the occupant 54 in the vehicle seating position 10, and an upper edge that may extend along a position above a first side of the head 56 (e.g., a right side of the head 56) of the occupant 54. Also, the middle portion 316b of the second lateral chamber 320b may have a lower edge that may extend along a position adjacent a second shoulder (e.g., a left shoulder) of the occupant 54 in the vehicle seating position 10, and an upper edge that may extend along a position above a second side of the head 56 (e.g., a left side of the head 56) of the occupant 54.

In an alternative embodiment, the airbag assembly 300 may be configured such that the first and second lateral chambers 320a, 320b are in fluid communication with each other by means of a single housing 310, wherein a single inflator assembly 305 may be coupled to the housing 310.

Figures 4A, 4B:
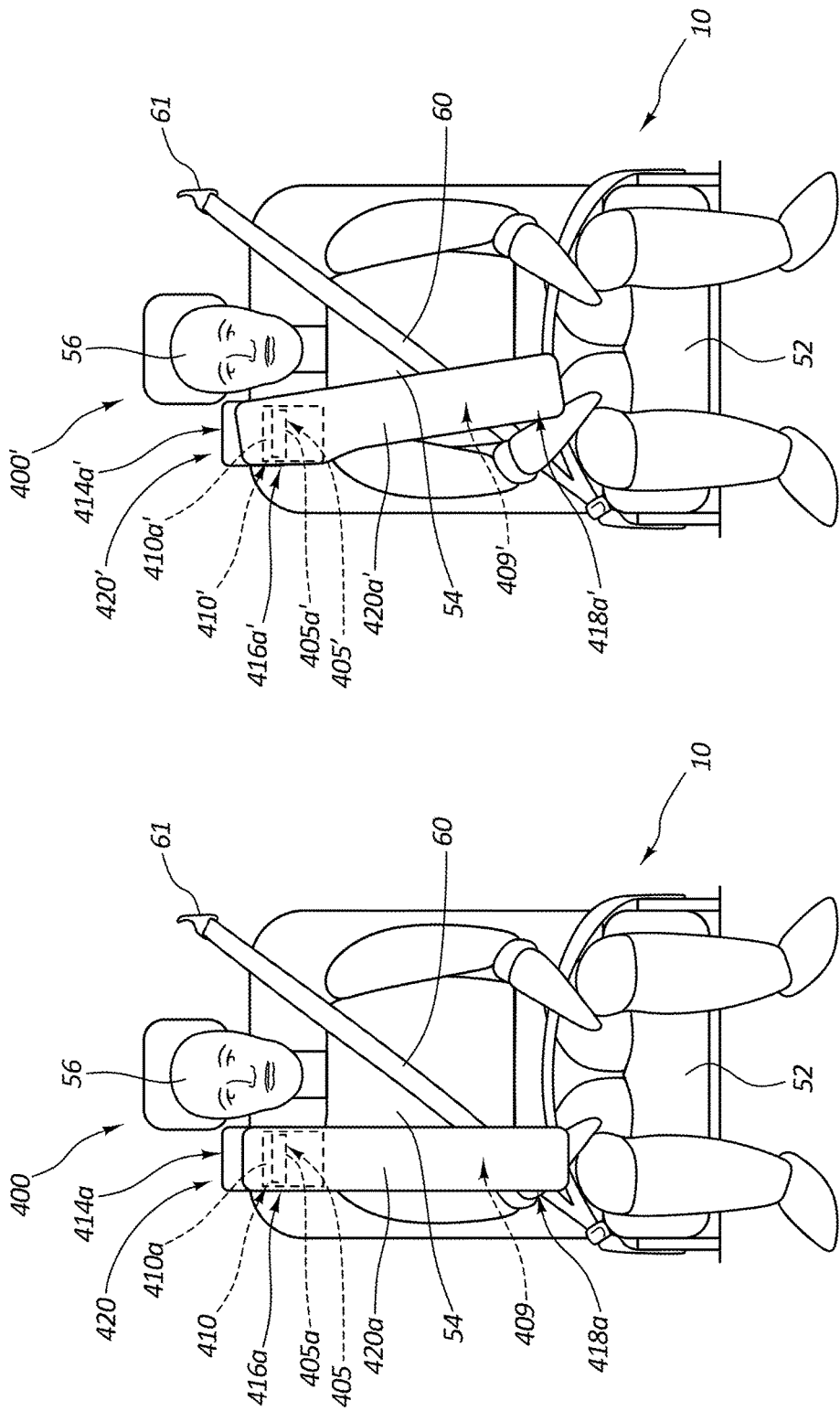
FIG. 4A is a front view of an airbag assembly, according to another embodiment of the present disclosure, in a deployed state.
FIG. 4B is a front view of an airbag assembly, according to another embodiment of the present disclosure, in a deployed state.

FIG. 4A depicts an embodiment of an inflatable airbag harness assembly or airbag assembly 400. As shown, an occupant 54 is positioned on a seat 52 in a vehicle seating position 10. Furthermore, a seatbelt 60 is disposed around the occupant 54. The airbag assembly 400 can include a housing 410, an inflator assembly 405, and an inflatable cushion 420, wherein the inflatable cushion 420 is coupled to the housing 410. The inflatable cushion 420 may include a first lateral chamber 420a. The inflator assembly 405 may include a first inflator 405a.

The airbag assembly 400 may be attached or coupled to the seat 52 of a vehicle in any suitable manner. For example, as illustrated in FIG. 4A, the airbag assembly 400 may be disposed within an upper rear portion of the seat 52. The inflatable cushion 420 can define a void 409 that is configured to receive inflation gas (i.e., during a collision event or a vehicle impact event) from the inflator assembly 405 that may expand the inflatable cushion 420 from a packaged state within the housing 410 to a deployed state.

The first lateral chamber 420a can include a proximal portion 414a, a middle portion 416a, and a distal portion 418a. The proximal portion 414a can be coupled to the housing 410 at a first end, and coupled to the middle portion 416a at a second end. Furthermore, the middle portion 416a can be coupled to the proximal portion 414a at a first end and to the distal portion 418a at a second end. In certain embodiments, when the first lateral chamber 420a is inflated, the middle portion 416a can be disposed over a first shoulder and adjacent a first side of a head 56 of the occupant 54. The distal portion 418a can be coupled to the middle portion 416a at a first end and can be closed or sealed at a second end (i.e., a distal end). When the first lateral chamber 420a is inflated, the distal portion 418a can be disposed along at least a portion of a front of the torso of the occupant 54. For example, the distal portion 418a may extend from a position adjacent a shoulder of the occupant 54 to a position adjacent a lap of the occupant 54.

The proximal portion 414a of the first lateral chamber 420a of the inflatable cushion 420 may be coupled to the housing 410 (e.g., to the first inflator 405a) such that the proximal portion 414a is configured to receive the inflation gas from the inflator assembly 405. The portions of the first lateral chamber 420a (i.e., the proximal portion 414a, the middle portion 416a, and the distal portion 418a) may be in fluid communication with each other such that the proximal portion 414a is configured to allow or direct the inflation gas to flow through to the middle portion 416a and the middle portion 416a is configured to allow or direct the inflation gas to flow through to the distal portion 418a.

As shown, the first lateral chamber 420a may be disposed at or adjacent a first side of the vehicle occupant 54 (e.g., at a position opposite of an upper anchor 61 of the seatbelt 60). The first lateral chamber 420a may be configured such that the distal portion 418a of the first lateral chamber 420a is substantially parallel with a lateral edge of the seat 52.

FIG. 4B is a front view of an airbag assembly 400'. In contrast to the first lateral chamber 420a as depicted in FIG. 4A, the first lateral chamber 420a' of FIG. 4B is configured such that a distal portion 418a' of the first lateral chamber 420a' not parallel with a lateral edge of the seat 52. Specifically, the distal portion 418a' of the first lateral chamber 420a' may be configured such that the distal portion 418a' of the first lateral chamber 420a' is angled from a first lateral side of the occupant 54 to a second lateral side of the occupant 54. For example, the distal portion 418a' of the first lateral chamber 420a' may extend between a first shoulder of the occupant 54 and a position adjacent a midline of the occupant 54.

In some embodiments, the first lateral chamber 420a, 420a' can be configured to deploy over an inboard shoulder of the occupant 54 (i.e., the shoulder that is not restrained by the seat belt 60). In such a configuration, the first lateral chamber 420a, 420a' may balance or substantially balance the restraint forces (due to the first lateral chamber 420a, 420a' and the seatbelt 60, respectively) on the shoulders of the occupant 54. In certain embodiments, the first lateral chamber 420a, 420a' may protect the head 56 of the occupant during an oblique and/or lateral impact event (e.g., for a near side and/or a far side impact event). Such a configuration may provide protection to a vehicle occupant, but with a decreased cost, weight, and/or packaging in comparison to embodiments comprising first and second lateral chambers.

Figure 5A:
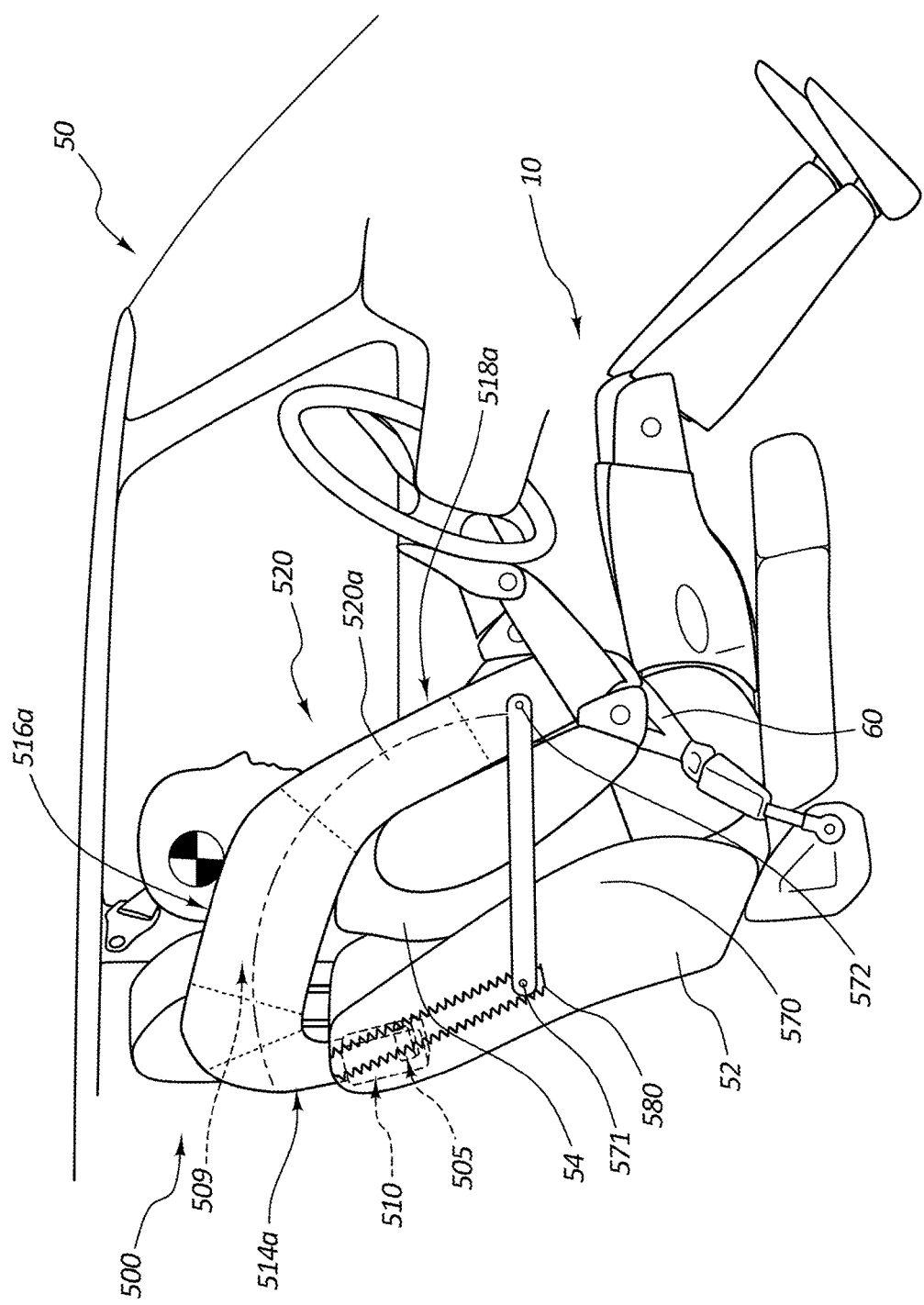
FIG. 5A is a side elevation view of an airbag assembly, according to another embodiment of the present disclosure, in a deployed state.

FIG. 5A depicts an embodiment of an inflatable airbag harness assembly or airbag assembly 500 mounted within a vehicle 50 in a deployed configuration or state. An occupant 54 is positioned on a seat 52. Further, a seatbelt 60 is disposed around the occupant 54. The airbag assembly 500 can include an inflatable cushion 520 coupled to a housing 510. The inflatable cushion 520 may include a first lateral chamber 520a and a second lateral chamber (not shown).

The airbag assembly 500 may be independent of or used independently of the seatbelt 60. The inflatable cushion 520 can define a void 509 that is configured to receive inflation gas (i.e., during a collision event or a vehicle impact event) from an inflator assembly 505 that may expand the inflatable cushion 520 from a packaged state within the housing 510 to a deployed state.

The first lateral chamber 520a can include a proximal portion 514a, a middle portion 516a, and a distal portion 518a. Likewise, the second lateral chamber can include a proximal portion, a middle portion, and a distal portion. The airbag assembly 500 can further include a tether 570. A first end 571 of the tether 570 may be coupled to the seat 52 and a second end 572 of the tether 570 may be coupled to the first lateral chamber 520a. For example, the first end 571 of the tether 570 may be coupled to a first lateral side of the seat 52 and the second end 572 of the tether 570 may be coupled to the distal portion 518a of the first lateral chamber 520a. Analogously, the airbag assembly 500 can further include a second tether, wherein a first end of the tether may be coupled to a second lateral side of the seat 52 and a second end of the tether may be coupled to the second lateral chamber.

When the airbag assembly 500 is in the packaged state, the tether 570 may be disposed within a portion of the seat 52. A tear seam 580 may also be disposed in a portion of the seat 52. Upon expansion of the inflatable cushion 520 from the packaged state to the deployed state, the tether 570 may tear through at least a portion of the tear seam 580. In certain embodiments, the tether 570 may act to restrain or support a portion of the inflatable cushion 520. The tether 570, anchored to the seat 52 low at a first end 571 and attached to the inflatable cushion 520 higher on the seat 52 in the packaged state, deploys out of the seat and pivots about the lower first end 571 in an arc-like fashion. The tether 570 is drawn taut during deployment and pulls the free end of the inflatable cushion 520 downward and limits it's trajectory/forward deployment. For example, the occupant 54 may move from a vehicle seating position 10 in a forward direction relative to the vehicle 50 during a vehicle impact event. Accordingly, the tether 570 may limit or prevent a portion of the inflatable cushion 520 from moving in a forward direction relative to the vehicle 50 upon impact with the occupant 54 (e.g., during the vehicle impact event). The tether 570 may also limit or prevent movement of the occupant 54 from the vehicle seating position 10 is a lateral direction relative to the vehicle 50, for example, during an oblique impact event.

Figure 5B:
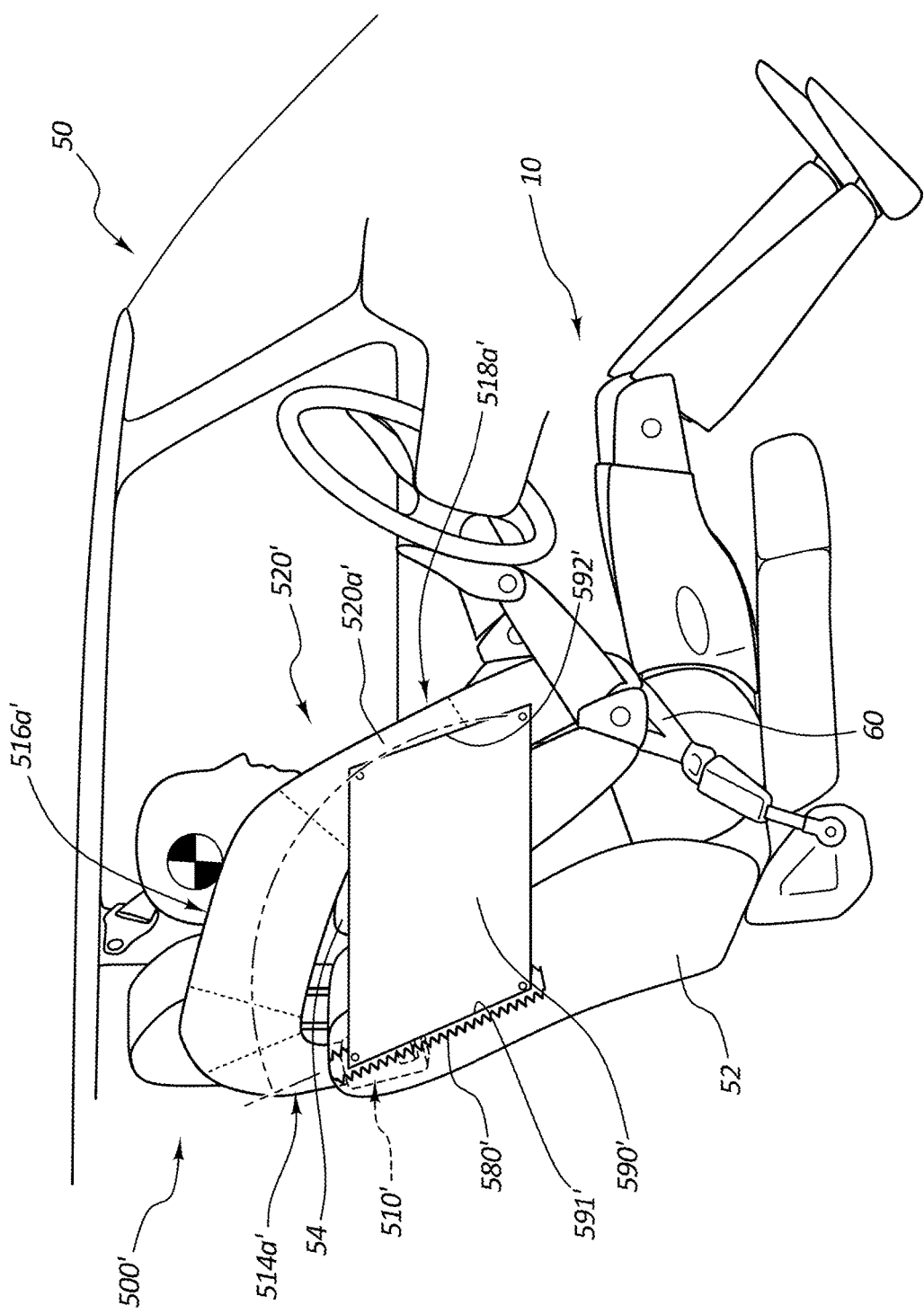
FIG. 5B is a side elevation view of an airbag assembly, according to another embodiment of the present disclosure, in a deployed state.

FIG. 5B is a side elevation view of an airbag assembly 500'. The airbag assembly 500' can include an inflatable cushion 520' coupled to a housing 510'. The inflatable cushion 520' may include a first lateral chamber 520a' and a second lateral chamber (not shown).

The first lateral chamber 520a' can include a proximal portion 514a', a middle portion 516a', and a distal portion 518a'. Likewise, the second lateral chamber can include a proximal portion, a middle portion, and a distal portion. The airbag assembly 500' can further include a panel 590' (e.g., a sail panel). A first edge 591' of the panel 590' may be coupled to the seat 52 and a second edge 592' of the panel 590' may be coupled to the first lateral chamber 520a'. For example, the first edge 591' of the panel 590' may be coupled to a first lateral side of the seat 52 and the second edge 592' of the panel 590' may be coupled to the distal portion 518a' of the first lateral chamber 520a'. Analogously, the airbag assembly 500' can further include a second panel, wherein a first edge of the panel may be coupled to a second lateral side of the seat 52 and a second edge of the panel may be coupled to the second lateral chamber.

When the airbag assembly 500' is in the packaged state, the panel 590' may be disposed within a portion of the seat 52. A tear seam 580' may also be disposed in a portion of the seat 52. Upon expansion of the inflatable cushion 520' from the packaged state to the deployed state, the panel 590' may tear through at least a portion of the tear seam 580'. In certain embodiments, the panel 590' may act to restrain or support a portion of the inflatable cushion 520'. For example, the occupant 54 may move from a vehicle seating position 10 in a forward direction relative to the vehicle 50 during a vehicle impact event. Accordingly, the panel 590' may limit or prevent a portion of the inflatable cushion 520' from moving in a forward direction relative to the vehicle 50 upon impact with the occupant 54 (e.g., during the vehicle impact event). The panel 590' may also limit or prevent movement of the occupant 54 from the vehicle seating position 10 is a lateral direction relative to the vehicle 50, for example, during an oblique impact event.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

As used herein, the terms "forward" and "rearward" are used with reference to the front and back of the relevant vehicle. For example, an airbag cushion that deploys in a rearward direction deploys toward the back of a vehicle.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising
    a housing to mounted to a seat of a vehicle;
    an inflator assembly; and
    an inflatable cushion, independent of a restraining system, that defines a void to receive inflation gas from the inflator assembly to expand the inflatable cushion from a packaged state within the housing to a deployed state, the inflatable cushion comprising:
        a first lateral chamber to deploy at a first lateral side and forward of a vehicle seating position; and
        a second lateral chamber to deploy at a second lateral side and forward of the vehicle seating position,
        wherein the first lateral side is disposed opposite of the second lateral side relative to the vehicle seating position, and wherein the first and second lateral chambers are to be positioned in the deployed state to receive at least a portion of a torso of a vehicle occupant moving from the vehicle seating position in a forward or lateral direction relative to the vehicle during a vehicle impact event.

2. The airbag assembly of claim 1, wherein the housing is to be mounted to upper rear portion of the seat.

3. The airbag assembly of claim 1, wherein the housing comprises:
    a first lateral housing portion coupled to a first inflator of the inflator assembly, wherein the first lateral chamber is configured to deploy from the first lateral housing portion; and
    a second lateral housing portion coupled to a second inflator of the inflator assembly, wherein the second lateral chamber is configured to deploy from the second lateral housing portion.

4. The airbag assembly of claim 1, the first lateral chamber comprising a proximal portion, a middle portion, and a distal portion, wherein the proximal portion is coupled to the housing, and wherein when the first lateral chamber is in the deployed state, the middle portion is disposed over a first shoulder and adjacent a first side of a head of the vehicle occupant in the vehicle seating position, and the distal portion is disposed along a front of the torso of the vehicle occupant in the vehicle seating position.

5. The airbag assembly of claim 4, the second lateral chamber comprising a proximal portion, a middle portion, and a distal portion, wherein the proximal portion is coupled to the housing, and wherein when the second lateral chamber is in the deployed state, the middle portion is disposed over a second shoulder and adjacent a second side of the head of the vehicle occupant in the vehicle seating position, and the distal portion is disposed along the front of the torso of the vehicle occupant in the vehicle seating position.

6. The airbag assembly of claim 5, wherein, when the first and second lateral chambers are in the deployed state, the distal portion of the first lateral chamber is substantially parallel with the distal portion of the second lateral chamber.

7. The airbag assembly of claim 5, wherein the distal portion of the first lateral chamber is configured to deploy toward the distal portion of the second lateral chamber such that the first and second lateral chambers are angled toward each other when the first and second lateral chambers are in the deployed state.

8. The airbag assembly of claim 4, wherein the middle portion of the first lateral chamber includes a lower edge and an upper edge, and wherein, when the first lateral chamber is in the deployed state, the lower edge extends along a position adjacent the first shoulder of the vehicle occupant in the vehicle seating position, and the upper edge extends along a position adjacent a roof of the vehicle, and wherein the middle portion of the first lateral chamber is configured to receive at least a portion of the head of the vehicle occupant.

9. The airbag assembly of claim 1, wherein the first and second lateral chambers have a curved profile, such that the first and second lateral chambers are configured to be disposed around a portion of the torso of the vehicle occupant in the vehicle seating position.

10. The airbag assembly of claim 1, further comprising a tether, wherein a first end of the tether is configured to be coupled to the seat of the vehicle and a second end of the tether is coupled to the first lateral chamber.

11. The airbag assembly of claim 1, further comprising a panel, wherein a first edge of the panel is configured to be coupled to the seat of the vehicle and a second edge of the panel is coupled to the first lateral chamber.

12. An inflatable airbag, independent of a restraining system, to be mounted at a seat of a vehicle, the inflatable airbag to receive inflation gas from an inflator assembly to expand from a packaged state to a deployed state, the inflatable airbag comprising:
   a first lateral chamber to deploy at a first lateral side of a head of a vehicle occupant seated in a vehicle seating position, wherein the first lateral chamber is configured to receive at least a portion of the head of the vehicle occupant moving from the vehicle seating position in a lateral direction relative to the vehicle during a vehicle impact event.

13. The inflatable airbag of claim 12, further comprising a second lateral chamber to deploy at a second lateral side of the head of the vehicle occupant seated in the vehicle seating position, wherein the first lateral side is disposed opposite of the second lateral side relative to the vehicle seating position.

14. The inflatable airbag of claim 13, wherein, in the deployed state, an upper edge of the first lateral chamber is to contact a roof of the vehicle, and
   wherein, in the deployed state, an upper edge of the second lateral chamber is configured to contact the roof of the vehicle.

15. The inflatable airbag of claim 14, wherein when the first lateral chamber is in the deployed state, contact between a top edge of the first lateral chamber and the roof is to displace a lower edge of the first lateral chamber toward a first shoulder of the vehicle occupant in the vehicle seating position.

16. The inflatable airbag of claim 15, wherein when the second lateral chamber is in the deployed state, contact between a top edge of the second lateral chamber and the roof is to displace a lower edge of the second lateral chamber toward a second shoulder of the vehicle occupant in the vehicle seating position.

17. The inflatable airbag of claim 12, the first lateral chamber comprising a proximal portion and a lateral portion, wherein the proximal portion couples to a housing, and
   wherein, when the first lateral chamber is in the deployed state, an upper edge of the lateral portion is in contact with the roof of the vehicle and a lower edge of the lateral portion is disposed adjacent a first shoulder of the vehicle occupant seated in the vehicle seating position.

18. The inflatable airbag of claim 17, the second lateral chamber comprising a proximal portion and a lateral portion, wherein the proximal portion couples to a housing, and
   wherein, when the second lateral chamber is in the deployed state, an upper edge of the lateral portion is in contact with the roof of the vehicle and a lower edge of the lateral portion is disposed adjacent a second shoulder of the vehicle occupant seated in the vehicle seating position.

19. The inflatable airbag of claim 17, wherein the first lateral chamber further comprises a distal portion, and
   wherein, when the first lateral chamber is in the deployed state, the distal portion is disposed along a front of a torso of the vehicle occupant in the vehicle seating position.

20. The inflatable airbag of claim 19, wherein the second lateral chamber further comprises a distal portion, and
   wherein, when the second lateral chamber is in the deployed state, the distal portion is disposed along the front of the torso of the vehicle occupant in the vehicle seating position.

21. The inflatable airbag of claim 20, wherein when the first and second lateral chambers are in the deployed state, the distal portion of the first lateral chamber is substantially parallel with the distal portion of the second lateral chamber.

22. The inflatable airbag of claim 12, to deploy from a housing mounted to an upper rear portion of the seat.

23. An airbag assembly comprising:
   a first housing to be mounted to a seat of a vehicle;
   a first inflator assembly; and
   a first inflatable cushion, independent of a restraining system, that defines a void that is configured to receive inflation gas from the first inflator assembly to expand the first inflatable cushion from a packaged state within the first housing to a deployed state, the first inflatable cushion comprising:
      a first lateral chamber to deploy at a first lateral side and forward of a vehicle seating position; and
      a second lateral chamber to deploy at a second lateral side and forward of the vehicle seating position, wherein the first lateral side is disposed opposite of the second lateral side relative to the vehicle seating position, and wherein the first and second lateral chambers are to receive at least a portion of a torso of a vehicle occupant moving from the vehicle seating position in one or both of a forward direction and a lateral direction relative to the vehicle during a vehicle impact event.

24. The airbag assembly of claim 23, further comprising:
   a second housing to be mounted to one of a steering wheel and a dashboard of the vehicle;
   a second inflator assembly; and
   a second inflatable cushion that defines a void to receive inflation gas from the second inflator assembly to expand the second inflatable cushion from a packaged state within the second housing to a deployed state, the second inflatable cushion configured to deploy away from the steering wheel or the dashboard toward the vehicle seating position.

* * * * *

UNITED STATES PATENT AND TRADEMARK OFFICE
CERTIFICATE OF CORRECTION

PATENT NO. : 10,336,278 B2
APPLICATION NO. : 15/650678
DATED : July 2, 2019
INVENTOR(S) : David W. Schneider It is certified that error appears in the above-identified patent and that said Letters Patent is hereby corrected as shown below:

In the Claims

Column 15, Line 67 In Claim 1, reads, "a housing to mounted to a seat of a vehicle;" which should read "a housing to be mounted to a seat of a vehicle;"

Signed and Sealed this
Nineteenth Day of November, 2019

Andrei Iancu
*Director of the United States Patent and Trademark Office*